(12) United States Patent
Zhou et al.

(10) Patent No.: US 10,862,834 B2
(45) Date of Patent: Dec. 8, 2020

(54) METHOD AND APPARATUS FOR GENERATING DESCRIPTIVE TEXTS CORRESPONDING TO CHAT MESSAGE IMAGES VIA A CONDITION PROBABILITY MODEL

(71) Applicant: TENCENT TECHNOLOGY (SHENZHEN) COMPANY LIMITED, Shenzhen (CN)

(72) Inventors: Ganbin Zhou, Shenzhen (CN); Ping Luo, Shenzhen (CN); Rongyu Cao, Shenzhen (CN); Fen Lin, Shenzhen (CN); Bo Chen, Shenzhen (CN); Qing He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 41 days.

(21) Appl. No.: 16/354,117

(22) Filed: Mar. 14, 2019

(65) Prior Publication Data
US 2019/0215286 A1     Jul. 11, 2019

Related U.S. Application Data

(63) Continuation of application No. PCT/CN2017/107450, filed on Oct. 24, 2017.

(30) Foreign Application Priority Data

Nov. 14, 2016    (CN) .......................... 2016 1 1002187

(51) Int. Cl.
*H04L 12/58* (2006.01)
*H04L 29/06* (2006.01)
(Continued)

(52) U.S. Cl.
CPC ............ *H04L 51/10* (2013.01); *G06F 40/242* (2020.01); *G06F 40/289* (2020.01); *G06F 40/30* (2020.01);
(Continued)

(58) Field of Classification Search
CPC ..... H04L 51/10; H04L 65/1063; H04L 51/04; H04L 51/063; H04L 65/605; G06F 40/30;
(Continued)

(56) References Cited

U.S. PATENT DOCUMENTS 6,563,521 B1 * 5/2003 Perttunen ............ G06F 16/9027
715/854
6,904,560 B1 * 6/2005 Panda ..................... G06F 16/58
715/202

(Continued)

FOREIGN PATENT DOCUMENTS

| CN | 101794292 A | 8/2010 |
|---|---|---|
| CN | 102323873 A | 1/2012 |

(Continued)

OTHER PUBLICATIONS

The World Intellectual Property Organization (WIPO) International Search Report for PCT/CN2017/107450 dated Jan. 22, 2018 5 Pages (including translation).

*Primary Examiner* — Daniel C. Murray
(74) *Attorney, Agent, or Firm* — Anova Law Group, PLLC

(57) ABSTRACT

A chat message processing method is provided for a server. The method includes receiving a chat message sent by a sending terminal, where the chat message carries information about a receiving terminal, and forwarding the chat message to the receiving terminal. The method also includes, when determining that the chat message comprises an image, generating at least one group of descriptive texts (Continued)

used for describing the image; and sending the at least one group of descriptive texts of the image to the receiving terminal to cause the receiving terminal to, when displaying the image, simultaneously display the at least one group of descriptive texts as at least one candidate entering-item associated with the image.

20 Claims, 9 Drawing Sheets

(51) Int. Cl.
  *G06K 9/46* (2006.01)
  *G06F 40/30* (2020.01)
  *G06F 40/56* (2020.01)
  *G06F 40/242* (2020.01)
  *G06F 40/289* (2020.01)

(52) U.S. Cl.
  CPC .............. *G06F 40/56* (2020.01); *G06K 9/46* (2013.01); *G06K 9/4685* (2013.01); *H04L 51/04* (2013.01); *H04L 51/063* (2013.01); *H04L 65/1063* (2013.01); *H04L 65/605* (2013.01)

(58) Field of Classification Search
  CPC ...... G06F 40/56; G06F 40/242; G06F 40/289; G06K 9/46; G06K 9/4685
  See application file for complete search history.

(56) References Cited

U.S. PATENT DOCUMENTS

| | | | | |
|---|---|---|---|---|
| 7,028,050 B1* | 4/2006 | Rose | ...................... | G06F 16/58 |
| 8,391,618 B1* | 3/2013 | Chuang | .............. | G06K 9/00664 |
| | | | | 382/224 |
| 8,423,577 B1* | 4/2013 | Lee | ........................ | G06Q 10/02 |
| | | | | 707/793 |
| 8,521,515 B1* | 8/2013 | Harik | ........................ | G06F 40/274 |
| | | | | 704/9 |
| 8,539,034 B2* | 9/2013 | Dezonno | .............. | G06Q 10/107 |
| | | | | 709/207 |
| 8,539,359 B2* | 9/2013 | Rapaport | ............... | G06Q 10/10 |
| | | | | 715/751 |
| 8,572,087 B1* | 10/2013 | Yagnik | ............... | G06K 9/00684 |
| | | | | 707/738 |
| 8,688,720 B1* | 4/2014 | Harik | ...................... | G06F 16/35 |
| | | | | 707/755 |
| 8,996,639 B1* | 3/2015 | Faaborg | ................... | H04L 51/02 |
| | | | | 455/412.1 |
| 9,161,188 B2* | 10/2015 | Smadja | .................. | G06F 40/274 |
| 9,191,786 B2* | 11/2015 | Davis | .................. | H04W 4/12 |
| 9,514,748 B2* | 12/2016 | Reddy | .................... | G10L 25/30 |
| 9,715,496 B1* | 7/2017 | Sapoznik | .......... | H04M 3/42382 |
| 9,805,371 B1* | 10/2017 | Sapoznik | ............ | G06F 40/205 |
| 9,817,813 B2* | 11/2017 | Faizakof | ............ | G10L 15/1815 |
| 10,015,124 B2* | 7/2018 | McGregor, Jr. | ......... | H04L 51/32 |
| 10,025,475 B1* | 7/2018 | Cohen | ..................... | H04L 51/04 |
| 10,146,768 B2* | 12/2018 | Fuxman | ............... | G06F 40/274 |
| 10,412,030 B2* | 9/2019 | McGregor, Jr. | ......... | G06K 9/726 |
| 10,567,318 B2* | 2/2020 | McNiece | ............... | H04L 51/08 |
| 10,726,465 B2* | 7/2020 | Dey | ................... | G06Q 30/0633 |
| 10,757,043 B2* | 8/2020 | Gershony | ............... | H04L 51/16 |
| 2001/0056352 A1* | 12/2001 | Xun | ........................ | G06F 40/47 |
| | | | | 704/277 |
| 2003/0014238 A1* | 1/2003 | Xun | ..................... | G06F 40/211 |
| | | | | 704/4 |
| 2003/0065776 A1* | 4/2003 | Malik | ................... | G06F 3/0482 |
| | | | | 709/225 |
| 2003/0105589 A1* | 6/2003 | Liu | ........................ | G06F 16/40 |
| | | | | 702/1 |
| 2005/0076338 A1* | 4/2005 | Malik | ................... | H04M 3/436 |
| | | | | 718/100 |
| 2005/0171757 A1* | 8/2005 | Appleby | ................ | G06F 40/45 |
| | | | | 704/2 |
| 2005/0209983 A1* | 9/2005 | MacPherson | ......... | G06T 11/206 |
| 2007/0094217 A1* | 4/2007 | Ronnewinkel | ........ | G06F 16/353 |
| | | | | 706/52 |
| 2008/0005476 A1* | 1/2008 | Venkatesan | ......... | G06F 12/0802 |
| | | | | 711/118 |
| 2009/0076795 A1* | 3/2009 | Bangalore | ............... | G06F 40/30 |
| | | | | 704/9 |
| 2009/0164914 A1 | 6/2009 | Chen | | |
| 2010/0153392 A1* | 6/2010 | Branca | .................. | G06F 40/157 |
| | | | | 707/736 |
| 2012/0245944 A1* | 9/2012 | Gruber | .................. | G10L 15/265 |
| | | | | 704/270.1 |
| 2013/0343619 A1* | 12/2013 | Criminisi | ............. | G06K 9/6219 |
| | | | | 382/128 |
| 2013/0346885 A1* | 12/2013 | Singh | ....................... | H04L 51/10 |
| | | | | 715/758 |
| 2014/0088954 A1* | 3/2014 | Shirzadi | ................ | G06F 40/166 |
| | | | | 704/9 |
| 2014/0136971 A1* | 5/2014 | Kumar | .................. | G06F 40/106 |
| | | | | 715/273 |
| 2014/0163954 A1* | 6/2014 | Joshi | ..................... | G06F 40/274 |
| | | | | 704/9 |
| 2015/0058720 A1* | 2/2015 | Smadja | .................... | H04W 4/14 |
| | | | | 715/271 |
| 2015/0178388 A1* | 6/2015 | Winnemoeller | .... | H04L 12/1827 |
| | | | | 707/722 |
| 2015/0199967 A1* | 7/2015 | Reddy | ..................... | G10L 15/22 |
| | | | | 704/249 |
| 2015/0207765 A1* | 7/2015 | Brantingham | ........ | H04L 51/046 |
| | | | | 715/758 |
| 2015/0302301 A1* | 10/2015 | Petersen | ............... | G06Q 10/107 |
| | | | | 706/11 |
| 2015/0350118 A1* | 12/2015 | Yang | ...................... | G06F 3/0484 |
| | | | | 715/752 |
| 2016/0042252 A1* | 2/2016 | Sawhney | ................ | G06F 16/55 |
| | | | | 382/190 |
| 2016/0210279 A1* | 7/2016 | Kim | ...................... | G06F 40/30 |
| 2016/0342895 A1* | 11/2016 | Gao | ...................... | G06F 40/56 |
| 2017/0068904 A1* | 3/2017 | Korycki | ................... | H04L 51/04 |
| 2017/0068906 A1* | 3/2017 | Korycki | ................... | G06Q 10/04 |
| 2017/0149703 A1* | 5/2017 | Willett | ..................... | H04L 51/24 |
| 2017/0171117 A1* | 6/2017 | Carr | ........................ | H04L 51/16 |
| 2017/0180276 A1* | 6/2017 | Gershony | ............... | H04L 51/18 |
| 2017/0180294 A1* | 6/2017 | Milligan | ................ | H04L 51/02 |
| 2017/0293834 A1* | 10/2017 | Raison | .................... | G06F 40/35 |
| 2018/0083898 A1* | 3/2018 | Pham | ..................... | H04L 51/02 |
| 2018/0083901 A1* | 3/2018 | McGregor, Jr. | ......... | H04L 51/32 |
| 2018/0107902 A1* | 4/2018 | Yang | ..................... | G06N 3/0445 |
| 2018/0137097 A1* | 5/2018 | Lim | ...................... | G06F 40/279 |
| 2018/0167347 A1* | 6/2018 | Patierno | ................ | H04L 51/10 |
| 2018/0210874 A1* | 7/2018 | Fuxman | ............... | G06N 3/0454 |
| 2018/0240015 A1* | 8/2018 | Martin | ..................... | G06N 3/04 |
| 2018/0247549 A1* | 8/2018 | Martin | .................... | G06F 40/30 |
| 2018/0295081 A1* | 10/2018 | McGregor, Jr. | ......... | G06K 9/726 |
| 2018/0302350 A1* | 10/2018 | Luo | ....................... | G06F 3/04886 |
| 2018/0309706 A1* | 10/2018 | Kim | ......................... | G06F 3/023 |
| 2018/0324117 A1* | 11/2018 | Badr | ....................... | H04L 51/10 |
| 2018/0367483 A1* | 12/2018 | Rodriguez | ............ | H04L 51/046 |
| 2018/0367484 A1* | 12/2018 | Rodriguez | ............. | H04L 51/02 |
| 2019/0392264 A1* | 12/2019 | Wang | ................ | G06K 9/00248 |
| 2020/0120049 A1* | 4/2020 | Galloway | ......... | H04M 1/72577 |
| 2020/0137000 A1* | 4/2020 | Wu | ...................... | G06N 3/0445 |
| 2020/0137001 A1* | 4/2020 | Wu | ....................... | G06F 40/253 |
| 2020/0150780 A1* | 5/2020 | Wu | ...................... | G06Q 30/0613 |
| 2020/0153768 A1* | 5/2020 | Cohen | ................... | H04L 65/1069 |
| 2020/0159997 A1* | 5/2020 | Wu | ....................... | G06N 3/0454 |

FOREIGN PATENT DOCUMENTS

| | | |
|---|---|---|
| CN | 103095557 A | 5/2013 |
| CN | 104142936 A | 11/2014 |

\* cited by examiner

METHOD AND APPARATUS FOR GENERATING DESCRIPTIVE TEXTS CORRESPONDING TO CHAT MESSAGE IMAGES VIA A CONDITION PROBABILITY MODEL

RELATED APPLICATIONS

This application a continuation application of PCT Patent Application No. PCT/CN2017/107450, filed on Oct. 24, 2017, which claims priority to Chinese Patent Application No. 201611002187.4, filed with the Chinese Patent Office on Nov. 14, 2016 and entitled "SESSION MESSAGE PROCESSING METHOD AND APPARATUS", content of all of which is incorporated herein by reference in its entirety.

FIELD OF TECHNOLOGY

This application relates to the field of communications technologies and, in particular, to a chat message processing method and apparatus.

BACKGROUND

Based on instant messaging applications, real-time chat interaction between two or more persons may be implemented by using communication networks. With the continuous development of network technologies, a chat message (or a session message) transmitted in an instant communication process is not limited to a text message, and may be image content such as a picture or a video.

Comparing to text messages, a chat message including an image includes a relatively large amount of information, and a user cannot rapidly and accurately obtain key information included in the image. Therefore, after the user in instant messaging receives the chat message including the image, and only after a relatively long time that the user may take to understand and analyze the image, the user can determine the key information included in the image, and then give a message reply to the chat message including the image. Consequently, smoothness of interaction between users in the instant messaging can be affected.

The disclosed methods and systems are directed to solve one or more problems set forth above and other problems.

SUMMARY

In view of this, embodiments of this application provide a chat message processing method and apparatus, so that a user can efficiently and accurately obtain key information of an image included in a chat message and improve smoothness of instant messaging.

To achieve the foregoing objective, according to one aspect, an embodiment of this application provides a chat message processing method applied to a server. The method includes receiving a chat message sent by a sending terminal, where the chat message carries information about a receiving terminal, and forwarding the chat message to the receiving terminal. The method also includes, when determining that the chat message comprises an image, generating at least one group of descriptive texts used for describing the image; and sending the at least one group of descriptive texts of the image to the receiving terminal to cause the receiving terminal to, when displaying the image, simultaneously display the at least one group of descriptive texts as at least one candidate entering-item associated with the image.

According to another aspect, an embodiment of this application further provides a chat message processing apparatus. The chat message processing apparatus includes a memory storing computer program instructions, and a processor coupled to the memory. When executing the computer program instructions, the processor is configured to perform: receiving a chat message sent by a sending terminal, the chat message carrying information about a receiving terminal; forwarding the chat message to the receiving terminal; when determining that the chat message comprises an image, generating at least one group of descriptive texts used for describing the image; and sending the at least one group of descriptive texts of the image to the receiving terminal to cause the receiving terminal to, when displaying the image, simultaneously display the at least one group of descriptive texts as at least one candidate entering-item associated with the image.

According to another aspect, an embodiment of this application further provides a non-transitory computer-readable storage medium. The non-transitory computer-readable storage medium stores computer program instructions executable by at least one processor to perform: receiving a chat message sent by a sending terminal, the chat message carrying information about a receiving terminal; forwarding the chat message to the receiving terminal; when determining that the chat message comprises an image, generating at least one group of descriptive texts used for describing the image; and sending the at least one group of descriptive texts of the image to the receiving terminal to cause the receiving terminal to, when displaying the image, simultaneously display the at least one group of descriptive texts as at least one candidate entering-item associated with the image.

Other aspects of the present disclosure can be understood by those skilled in the art in light of the description, the claims, and the drawings of the present disclosure.

BRIEF DESCRIPTION OF THE DRAWINGS

To describe the technical solutions in the embodiments of the present disclosure, the following briefly introduces the accompanying drawings for describing the embodiments. Apparently, the accompanying drawings in the following description show merely some but not all embodiments of the present disclosure, and a person of ordinary skill in the art may still derive other drawings from these accompanying drawings without creative efforts.

DETAILED DESCRIPTION

The following describes the technical solutions in the embodiments of the present disclosure with reference to the accompanying drawings. Apparently, the described embodiments are some embodiments of the present disclosure rather than all of the embodiments. Other embodiments obtained by a person of ordinary skill in the art based on the embodiments of the present disclosure without creative efforts shall fall within the protection scope of the present disclosure.

A chat message processing method according to an embodiment of the present disclosure may be applied to a chat message processing system.

Figure 1:
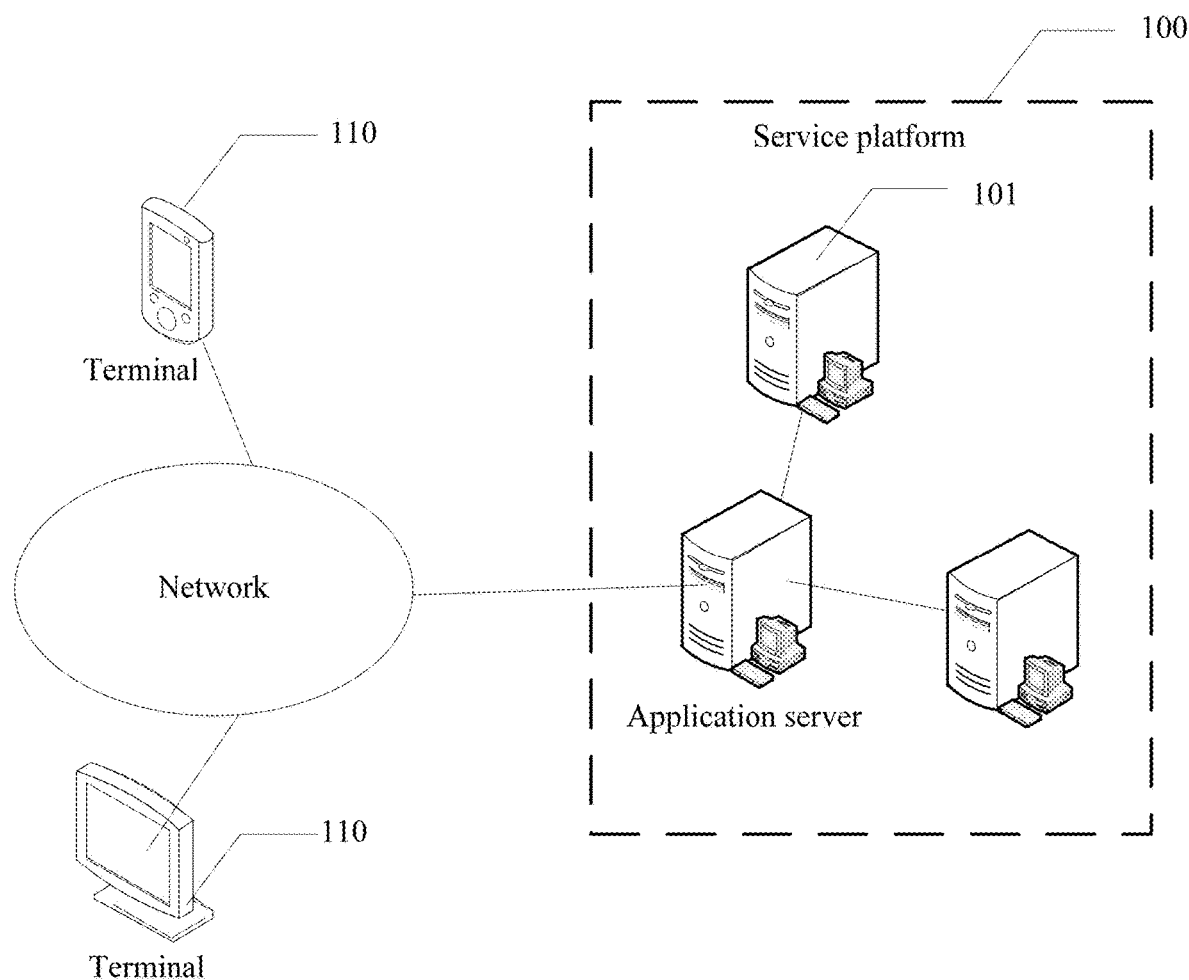
FIG. 1 is a schematic diagram of a chat message processing system disclosed according to an embodiment of the present disclosure.

FIG. 1 is a schematic diagram of a compositional structure of a chat message processing system according to an embodiment of the present disclosure. As shown in FIG. 1, the system may include an instant messaging platform 100 and at least two terminals 110.

The instant messaging platform may include at least one application server 101.

In an embodiment, to improve a processing efficiency of an instant messaging service, an instant messaging service platform may include an application server cluster formed by a plurality of application servers 101. The application is a type of servers.

The terminal 110 may be a client of an instant messaging application, for example, the terminal may be a mobile phone, a tablet computer, and a desktop computer.

In one embodiment of the present disclosure, the terminal 110 is configured to send a chat message to the instant messaging service platform, so that the application server in the instant messaging platform forwards the chat message to another terminal.

It should be noted that, in one embodiment of the present disclosure, the at least two terminals 110 include at least one terminal as the terminal of the sender that sends the chat message, and at least one terminal as the terminal of the receiver that receives the chat message. It may be understood that, because each terminal may receive and send the chat message, each terminal may be the terminal of the sender or the terminal of the receiver. However, for one chat message, the terminal of the sender and the terminal of the receiver of the chat message are fixed.

The application server 101 is configured to: after receiving the chat message sent by the terminal, forward the chat message to the terminal of the receiver according to information about the receiver that is carried in the chat message.

In one embodiment of the present disclosure, the chat message sent by the terminal to the application server is not limited to a text message and an audio message, and may further include a chat message including an image. For example, the form of the chat message may be a still picture, a dynamic picture, a video, or the like.

Figure 2A:
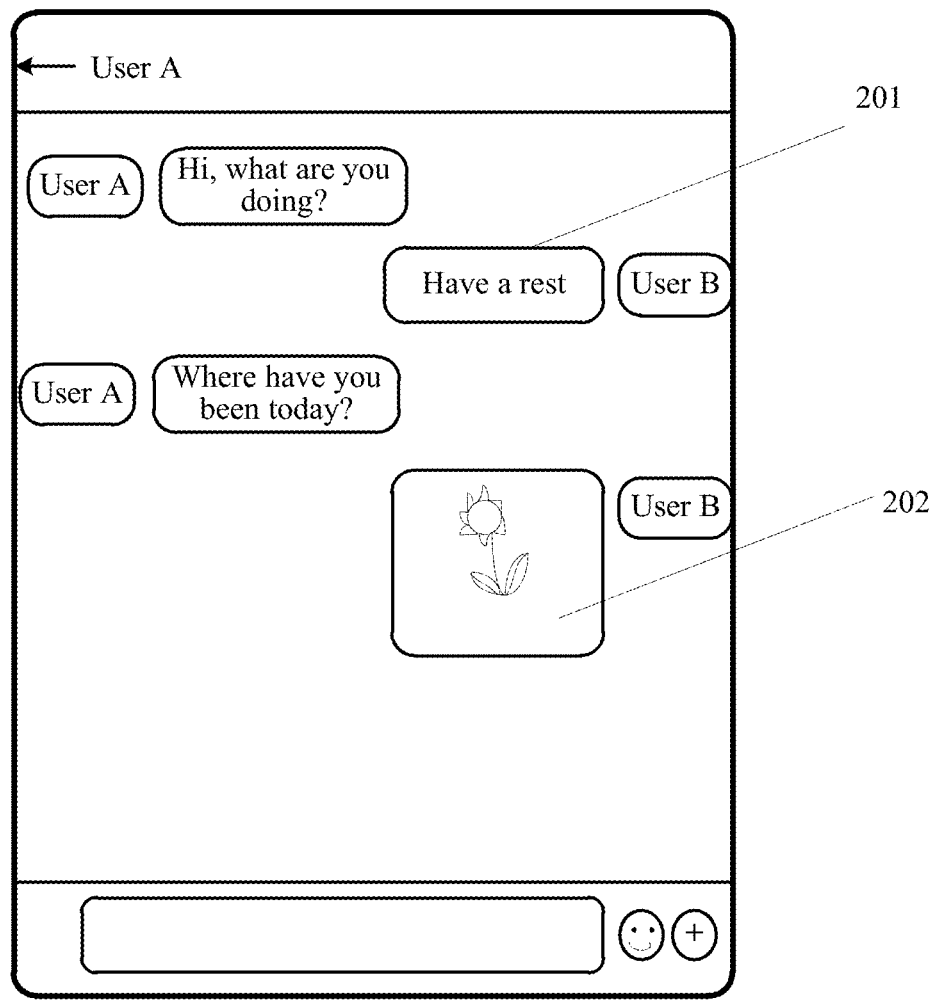
FIG. 2A is a schematic diagram of various forms of chat messages presented in an instant messaging chat window.

FIG. 2A shows a plurality of chat messages presented in a chat window of an instant messaging application of a terminal. As shown in FIG. 2A, in addition to a plurality of text messages 201, the chat window further displays chat messages 202 in a picture form.

Further, to ensure that a user of the terminal can rapidly and accurately learn key information included in an image in a chat message, in one embodiment of the present disclosure, an application server is further configured to: generate, when receiving a chat message including an image, at least one group of descriptive texts used for describing the image, and send the at least one group of descriptive texts to a terminal of a receiver of the chat message. The objective of generating the descriptive text used for describing the image is to convert content included in the image into a natural language and provide a description. The descriptive text may include phases and sentences used for describing information or content included in the image.

Correspondingly, the terminal is further configured to display, when the image included in the chat message is presented, at least one group of descriptive texts of the image as a candidate entering item associated with the image.

An example is described with reference to FIG. 2A. On the premises that a chat window of the terminal displays the chat message 202 in a picture form in FIG. 2A, if the terminal receives the descriptive text that is returned by the application server and that is used for describing a picture, reference may be made to FIG. 2B for an interface of the chat window. It may be learned from FIG. 2B that, a candidate text column 204 is displayed above a message entering box 203 of the chat window, and a plurality of candidate entering items is displayed in the candidate text column 204. Each candidate entering item is a group of descriptive texts. For example, the candidate text entry bar may include candidate entering items: "Which flower is it?", "This flower is so beautiful!", and "So beautiful, I love this flower too".

Figure 2B:
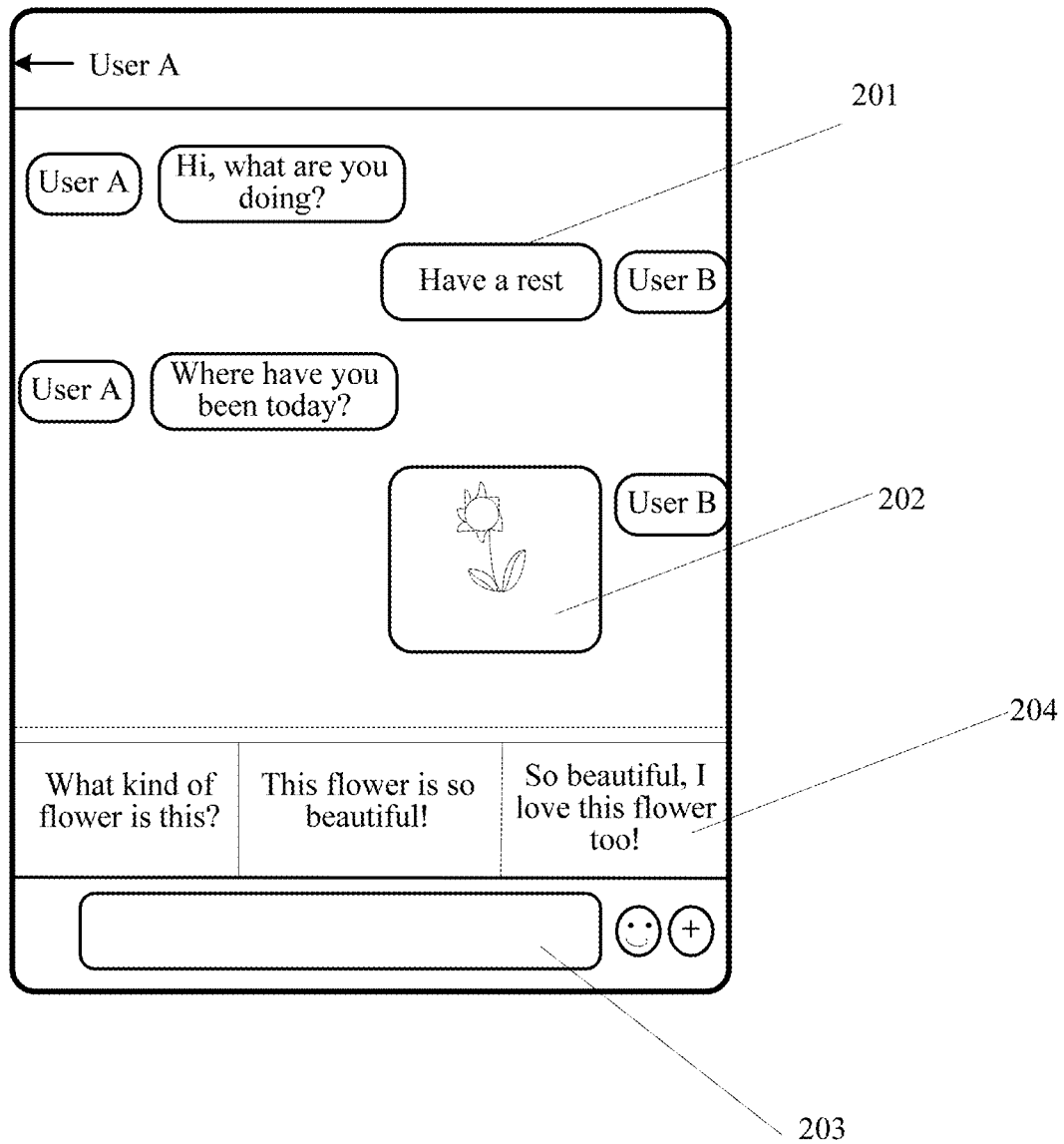
FIG. 2B is a schematic diagram of an effect of a candidate entering item of descriptive text that includes an image and that is presented in an instant messaging chat window.
Figure 2C:
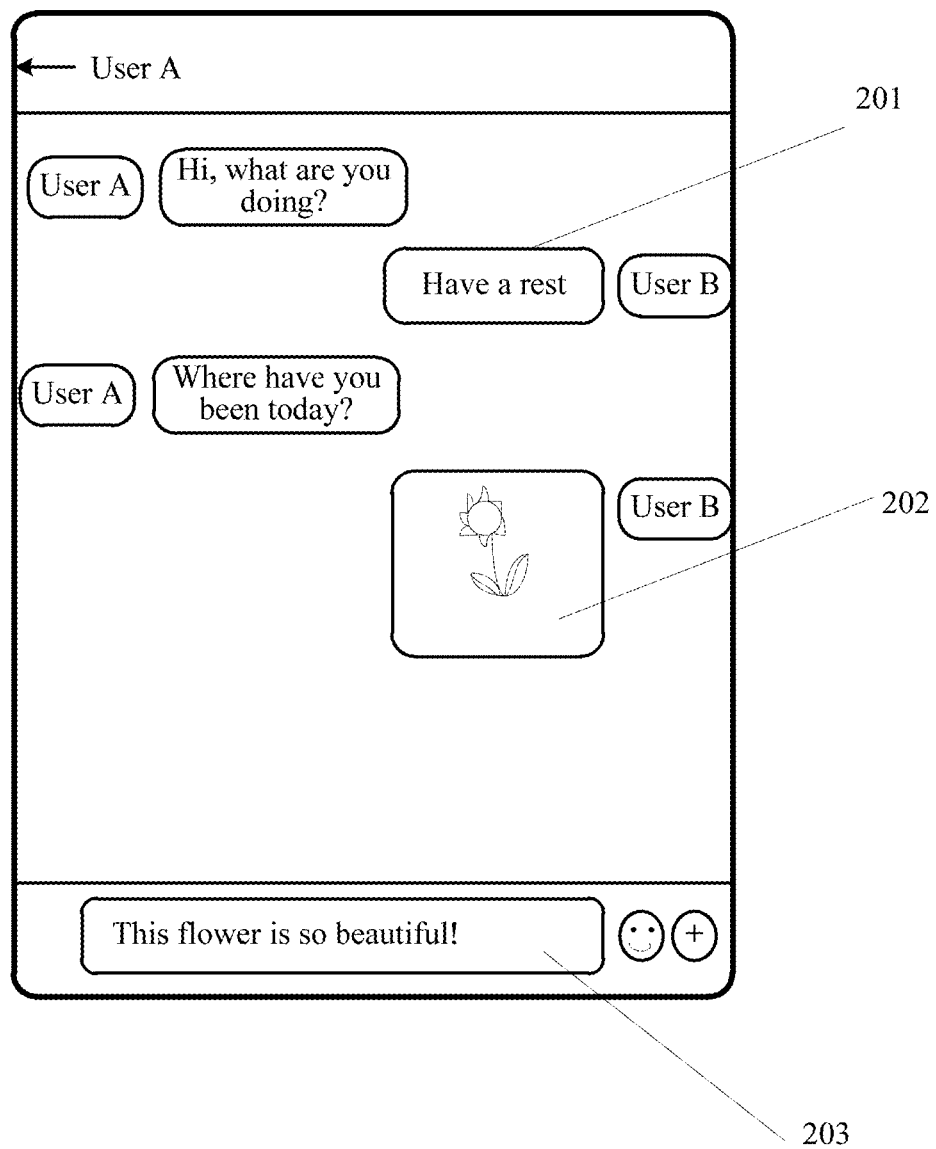
FIG. 2C is a schematic diagram of a display effect of a chat window after a user clicks the candidate entering item in FIG. 2B.

Further, the user may select a candidate entering item on an interface shown in FIG. 2B as required. If the user taps and selects the candidate entering item "This flower is so beautiful!", the terminal may enter descriptive text "This flower is so beautiful!" corresponding to the candidate entering item to the message entering box 203 of the chat window, as shown in FIG. 2C. It may be learned from FIG. 2C that, "This flower is so beautiful!" is entered in the message entering box 203.

Figure 3:
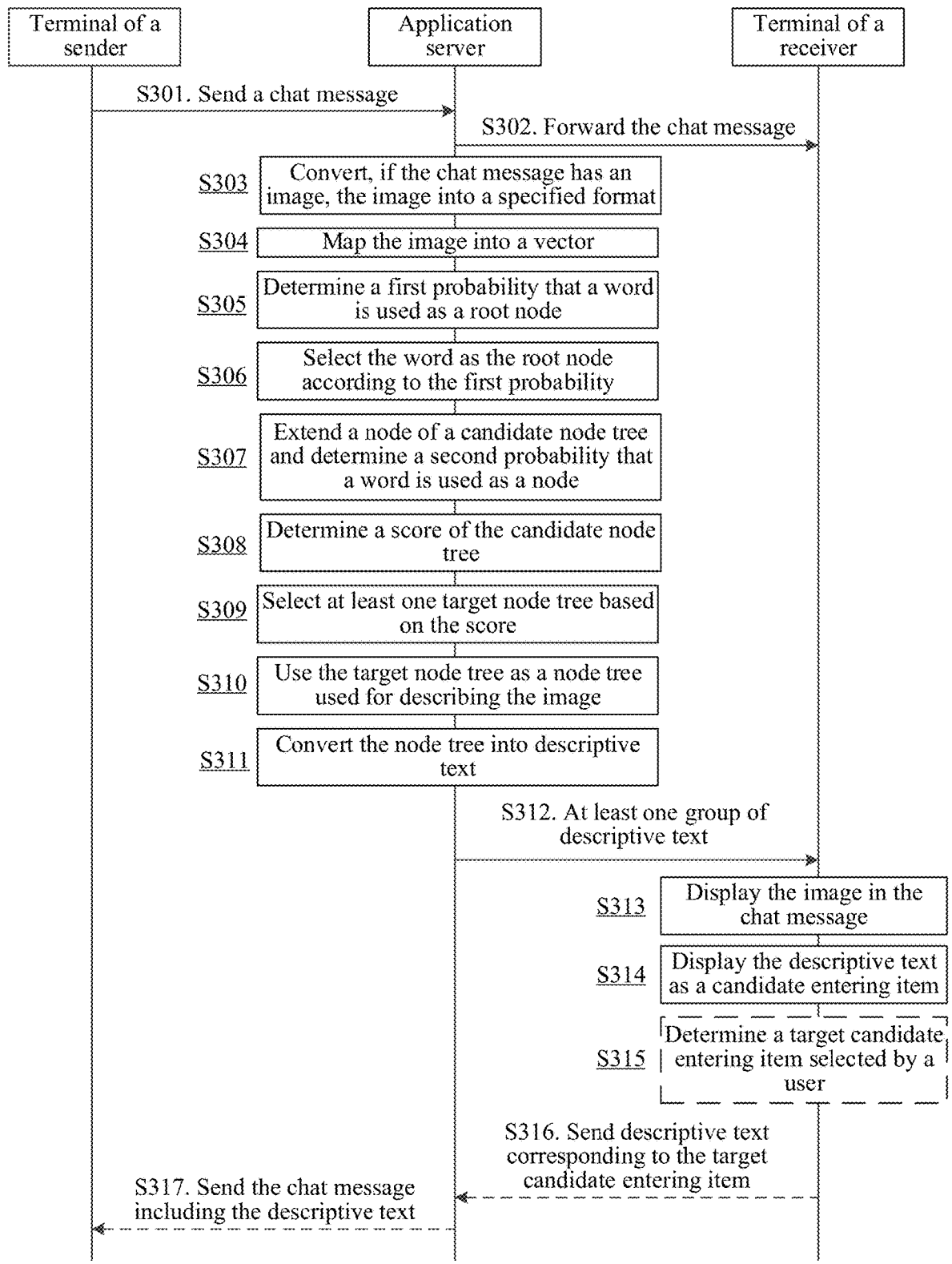
FIG. 3 is a schematic flowchart of a chat message processing method disclosed according to an embodiment of the present disclosure.

With reference to the common features, referring to FIG. 3, FIG. 3 is a schematic diagram of procedure interaction of a chat message processing method according to the present disclosure. One embodiment of the present disclosure is described by using an example in which the chat message is an image (commonly referred as a picture). The method in one embodiment of the present disclosure may include the followings.

S301. A terminal of a sender (i.e., a sending terminal) sends a chat message to an application server of an instant messaging platform, the chat message carrying information about a receiver.

The terminal of a receiver (i.e., receiving terminal) may be located by using the information about the receiver. For example, the information about the receiver may be information such as a user name of the receiver, an IP address corresponding to the receiver, and a unique identifier of the terminal of the receiver.

In an embodiment, to enable the application server to determine a source of the chat message, the chat message may further carry information about the sender, for example, a user name of the sender and an IP address corresponding to the sender.

S302. The application server forwards the chat message to a terminal of the receiver according to the information about the receiver.

It should be noted that one embodiment describes an example in which the application server directly forwards the chat message to the terminal of the receiver after receiving the chat message. However, it may understand that, in an actual application, the application server may alternatively send the chat message and the descriptive text together to the terminal of the receiver after the application server determines the descriptive text corresponding to the image in the chat message.

S303. Converting the image into an image having a specified size and a specified format when the application server determines that the chat message includes an image.

That is, the image is preprocessed. The specified size may be set as required. In an embodiment, the specified size may be determined by limiting numbers of horizontal and vertical pixels in the image. For example, the image is converted into an image having a first number of pixels horizontally, and having a second number of pixels vertically. The first number of pixels and the second number of pixels may be the same or may be different. Correspondingly, the specified format may also be set as required. In an embodiment, the specified format may be a format that each pixel in the image is represented by using a RGB value.

The image is preprocessed, and the image may be converted into an image represented by a three-dimensional matrix. For example, the image may be represented by a three-dimensional matrix (height, width, 3). The first dimension, height, represents a number of pixels vertically in the image, the second dimension, width, represents a number of pixels horizontally in the image, and the third dimension represents a value of each pixel in the image in the three basic color channels, R, G, and B. In this way, the three-dimensional matrix includes all information of the image.

It should be noted that the image is preprocessed for the convenience that the image is analyzed only after the image is normalized. In an embodiment, S303 may not be performed, and whether S303 is executed does not affect the implementation of the present disclosure.

S304. The application server maps the image obtained after conversion into a vector of a preset length.

The vector may be decoded by using a decoder, to finally generate descriptive words. The length of a preset vector is referred to as a preset length. There is a plurality of formats of mapping the image into the vector of a preset length.

In an embodiment, the image may be mapped into the vector of a preset length based on a convolutional neural network. For example, assuming that the image is normalized into a matrix $x^{(i)}$ having a fixed size of $(h_1, w_1, 3)$, a process of mapping the image into the vector of a preset length may be as follows.

First, a convolution operation is performed on the matrix $x^{(i)}$ of the image. The size of a convolution kernel is $(kh_1, kw_1)$, and the number of the convolution kernels is $n_1$. Therefore, an image obtained after the convolution operation is $(h_2, w_2, n_1)$. It may be understood that, the size of the convolution kernel determines the size of the image obtained after the convolution to some extent, and the number of the convolution kernels determines the depth of the image obtained after the convolution to some extent. Specifically, the size of the image before the convolution is $h_1*w_1$, and an image having a size of $h_2*w_2$ may be obtained after convolution is performed by using a convolution kernel having a size of $(kh_1, kw_1)$. $h_2=h_1-kh_1+1$, and $w_2=w_1-kw_1+1$. The depth of the image changes from 3 to $n_1$, that is, the image obtained after the convolution may be represented as a matrix having a size of $(h_2, w_2, n_1)$.

A maximum pooling operation is performed on the image obtained after the convolution. The size of maximum pooling is $(kh_2, kw_2)$, and the size of an image obtained after the pooling is $$(h_3, w_3, n_1).$$
$$h_3 = \frac{h_2}{kh_2}, w_3 = \frac{w_2}{kw_2}.$$

The size of the image can further be reduced through the pooling, and on the other hand, overfitting of the image can be avoided.

Then, rasterization processing is performed on the image obtained after the pooling, and an image obtained after the rasterization having a size of $(h_3*w_3*n_1, 1)$. The rasterization processing may be considered as a process in which the image is converted into an image formed by grids.

Finally, the image is converted into a vector $p^{(i)}$ having a preset length $n_2$ by using a fully connected layer.

The convolution kernel and the maximum size may be limited by a set parameter k, and a value of k may be pre-obtained through training. Correspondingly, the number $n_1$ of the convolution kernels and the preset length $n_2$ of the vector may also be obtained through training.

The objective of step S304 is to convert the image into a vector form, so that data processing is easily performed. However, it may be understood that, in an actual application, subsequent processing may be directly performed on the image, to determine the descriptive text used for describing the image. This is not limited herein.

S305. The application server determines, based on a preset root node probability model, a first probability that each word in the lexicon is used as a root node in the node tree used for describing the image.

In S304, the image is pre-processed and converted into a vector form. The node tree used for describing the image is equivalent to a node tree used for describing a vector. The probability that each word in the lexicon is used as the root node in the node tree used for describing the image is equivalent to a probability that each word in the lexicon is used as the root node in the node tree used for describing the vector. To distinguishing the two probabilities, in one embodiment, the probability that the word is used as the root node in the node tree used for describing the vector is referred to as the first probability.

The node tree includes the root node and sub-nodes, and nonempty nodes in the node tree may be considered as nodes necessary for formation of the node tree. In one embodiment of the present disclosure, the diversity of the descriptive text may be reflected by diversity of the root node. According to the structure of the root node and the sub-nodes, the node tree may be a ternary tree or a quaternary tree corresponding to the structure. In an embodiment, to make the descriptive text relatively more abundant, and avoid an excessively complex algorithm, the node tree in one embodiment may be a ternary tree.

In an embodiment, a condition probability model may be preset. The condition probability model includes a root node probability model used for calculating the first probability that the word is used as the root node in the node tree used for describing the vector. In this case, if the vector corresponding to the image is determined, the vector is input to a preset root node probability model, and the first probability that the word is used as the root node in the node tree used for describing the vector can be calculated based on the root node probability model. That is, the image may be converted into the vector of a preset length, and the vector is input to the root node probability model, so that the first probability that each word is used as the root node in the node tree used for describing the image is determined.

The condition probability model is a model obtained by training a deep neural network model with reference to a gradient descent method, to maximize a likelihood function of a data set on the premises that the data set formed by a plurality of images having known descriptive text is obtained. The condition probability model is used to calculate a probability that descriptive text formed by a plurality of words is used to describing the image, when the image is determined. Specifically, the condition probability model may be extended to represent a product of the root node probability model and an ordinary node probability model, and an output value of the condition probability model is equal to a product of an output value of the root node probability model and an output value of the ordinary node probability model.

It may be understood that, because the node tree may have different forms such as a ternary tree and a quaternary tree, the trained condition probability model may differ according to different forms of node trees.

S306. The application server selects, from words of the lexicon, a specified number of words having highest first probabilities as a specified number of root nodes respectively.

It may be understood that, for a determined image, sentences in the descriptive text may be more probably generated through extension by using a word of a high probability as the root node. Therefore, the node tree may be extended by using the specified number of root nodes having the highest first probabilities.

The specified number may be set as required, for example, the specified number may be three.

S307. The application server selects a word as a sub-node in a candidate node tree for any root node from the lexicon, and determine, based on a preset ordinary node probability model, a second probability that the selected word is used as the sub-node in the candidate node tree.

The candidate node tree is a node tree that is extended by using the root node as a reference. Because the candidate node tree needs to be gradually extended downward based on the root node to each layer of nodes, the candidate node tree may be understood as a node tree that is used for describing the image and that is not fully extended.

The node tree may have a plurality of layers, and each layer may include a plurality of nodes. For example, nodes on a same layer may be referred to as sister nodes, and nodes in upper and lower layers may be mutually referred to as parent and child sub-nodes. Therefore, when the candidate node tree is extended, the candidate node tree may be gradually extended downward starting from the root node. In addition, because nodes on the same layer with the candidate node tree may have various possible combinations of words, a candidate node tree having a relatively high probability is subsequently selected and a probability that a word is used as a node in the candidate node tree is determined on the premises that the image and nodes that needs to be extended in currently extended candidate node trees are determined. In one embodiment, the probability is referred to as the second probability. In an embodiment, a condition probability model may be preset. The condition probability model further includes an ordinary node probability model used for calculating the second probability that a word is used as a sub-node in the candidate node tree. In this way, if the candidate node tree and the root node are determined, the second probability that the word is used as the sub-node in the candidate node tree can be calculated based on the ordinary node probability model. Step S307 actually means that in a process in which the candidate node tree is extended, a second probability corresponding to each node on each layer in the candidate node tree is calculated, and all nodes are traversed.

In an embodiment, for any root node, the root node may be first used as a to-be-extended node in the candidate node tree; then, a word that can be used as a sub-node of the to-be-extended node is selected from the lexicon, and a second probability that the selected word is used as the sub-node of the to-be-extended node is determined based on a preset ordinary node probability model; and then, the sub-node obtained when the candidate node tree is newly extended is used as the to-be-extended node, the word selected from the lexicon is returned and used as the sub-node of the to-be-extended node, and a second probability corresponding to the selected word is calculated. Extension is performed in this way layer after layer until the candidate node tree fails to be extended. Further, based on the preset ordinary node probability model, when the probability that the word is used as the sub-node in the candidate node tree, mutual influence relationship between a parent node of the sub-node, an ancestor node of the parent node, and sister nodes of the sub-node may be considered.

For example, using a ternary tree as an example, for any to-be-extended node, words respectively used as a left sub-node, a right sub-node, and a middle sub-node of the to-be-extended node in the candidate node tree may be selected from the lexicon, and second probabilities corresponding to the words at the left sub-node, the right sub-node, and the middle sub-node are respectively calculated when the image, the to-be-extended node, and the ancestor nodes of the to-be-extended node are determined.

When a node obtained through extension performed on the candidate node tree is an empty node, extension does not need to be continuously performed downward from the node. In this way, it may be finally determined that until all nodes in the candidate node tree cannot be continuously extended downward, the candidate node tree cannot be continuously extended, and extension for the candidate node tree ends.

Because for other nodes than the root node in the candidate node tree, each node may select a plurality of words. In this way, candidate node trees of various combination forms may be obtained through extension by using the root node.

S308. The application server determines, for each candidate node tree, a score of the candidate node tree according to the first probability corresponding to the root node in the candidate node tree and the second probability corresponding to the word forming the sub-node in the candidate node tree.

The score of the candidate node tree may be a product of the first probability of the root node and the second probabilities corresponding to each word in other nodes than the root node in the candidate node tree. Certainly, there may be other ways of determining the score of the candidate node tree, provided that the specific way can reflect that the higher a probability is after the nodes in the candidate node tree are combined, the higher the score of the candidate node tree is.

S309. The application server determines at least one candidate node tree having a highest score as a target node tree used for describing the image.

It may be understood that, if the root node forming the candidate node tree and nodes on each layer each have a relatively high probability, it indicates that the descriptive text corresponding to the candidate node tree also has relatively high accuracy in describing the content of the image, and therefore, if the candidate node tree has a relatively high score, the descriptive text formed by the word at each node in the candidate node tree also has relatively high accuracy in describing the image.

In one embodiment, the selected candidate node tree is referred to as a target node tree, and the number of selected target node trees may be set as required. For example, the number may be one or two.

S310. The application server uses each target node tree as the node tree used for describing the image.

It may be understood that, the root node and the sub-node in the target node tree have a particular syntax relationship, for example, a parent node, a sub-node, and sister nodes. According to the syntax relationship between the nodes, words of the nodes form the descriptive text, and the descriptive text is obtained according to a vector of the image. Therefore, the target node tree may be used to describe the image. That is, each target node tree may be used as the node tree used for describing the image. In other possible implementation of the present disclosure, some target node trees may be used as the node tree used for describing the image. The number of node trees used for describing the image may be set according to requirements of the user, and is not limited in one embodiment of the present disclosure.

It should be noted that the objectives of steps S305 to S310 are to select words from the lexicon based on a mapping relationship between preset image features and the words, to construct at least one node tree used for describing the image. One embodiment is merely an embodiment for implementing the objectives, and in an actual application, there may be other specific implementations which are not described herein.

S311. The application server converts each node tree into descriptive text, to obtain at least one group of descriptive texts used for describing the image.

When the node tree is determined, according to relationships between nodes on each layer in the node tree, a position of a node corresponding to each node in the descriptive text may be determined, so that the descriptive text is obtained through conversion.

S312. The application server sends at least one group of descriptive texts of the image to the terminal of the receiver.

S313. The terminal of the receiver displays the image in the chat message.

The terminal of the receiver may display the image used as the chat message in a chat window, as shown in FIG. 2A.

S314. The terminal of the receiver displays the at least one group of descriptive texts as at least one candidate entering item associated with the image, so that a user selects the candidate entering item as content entered in the chat window.

Each group of descriptive texts may be used as a candidate entering item, and the user may select the descriptive text by tapping the candidate entering item and trigger the terminal of the receiver to send the descriptive text to the terminal of the sender of the image; or trigger the terminal of the receiver to enter the descriptive text to a message entering box in the chat window, and send the descriptive text again selected by the user after the user taps sending.

An example is described with reference to FIG. 2A. On the premises that a chat window of the terminal displays the chat message 202 in a picture form in FIG. 2A, if the terminal receives the descriptive text that is returned by the application server and that is used for describing a picture, reference may be made to FIG. 2B for an interface of the chat window. It may be learned from FIG. 2B that, a candidate text column 204 is displayed above a message entering box 203 of the chat window, and a plurality of candidate entering-items are displayed in the candidate text column 204. Each candidate entering-item is a group of descriptive texts. For example, the candidate text entry bar may include candidate entering-items: "Which flower is it?", "This flower is so beautiful!", and "So beautiful, I love this flower too".

It is assumed that the user may select a candidate entering-item on an interface shown in FIG. 2B as required. If the user taps and selects the candidate entering-item "This flower is so beautiful!", the terminal may enter descriptive text "This flower is so beautiful!" corresponding to the candidate entering-item to the message entering box 203 of the chat window, as shown in FIG. 2C. It may be learned from FIG. 2C that, "This flower is so beautiful!" is entered in the message entering box 203.

S315. The terminal of the receiver determines a target candidate entering-item selected by the user when detecting the candidate entering-item selected by the user.

S316. The terminal of the receiver sends descriptive text corresponding to the target candidate entering-item selected by the user to the server as the content of the chat message.

After the user of the terminal of the receiver selects the target candidate entering-item as entering content, the terminal of the receiver may directly send the descriptive text corresponding to the target candidate entering-item to the application server as content of a to-be-sent chat message. Certainly, the terminal of the receiver may send the descriptive text again to the application server after the user selects the target candidate entering-item, and the user confirms that the descriptive text has been sent.

It should be noted that a destination receiver of the chat message including the descriptive text is the terminal of the sender described above, but on the premises of step S316, the sender for sending the image actually changes to the receiver. For ease of description and distinguishing, in one embodiment, the terminal for sending the image is limited by the terminal of the sender.

S317. The application server converts the chat message including the descriptive text to the terminal of the sender.

For example, the application server forwards the chat message according to a message that is about the terminal of the sender and that is carried in the chat message including the descriptive text.

S315 to S317 are optional steps, and the objectives of S315 to S317 are to describe a process that the user selects the descriptive text to trigger sending of the descriptive text after the terminal presents the descriptive text.

It should be noted that the above is described by using an example in which the chat message includes an image. However, it may be understood that, when the chat message includes a plurality of images such as a video, the application server may respectively generate descriptive text for each image sequentially. Generation processes are similar and are not described again.

Certainly, for a case in which the chat message is a video or for other cases in which the chat message includes a plurality of image frames, because neighboring images have a relatively small difference, to reduce a data calculation amount, the descriptive text may be generated for specified image frames at intervals.

For ease of understanding the process of generating the node tree corresponding to the descriptive text of the image in one embodiment of the present disclosure, a description is provided by using an example in which a constructed node tree is a ternary tree, and a probability that each word in the lexicon is used as a node in the ternary tree is determined according to a pre-trained condition probability model.

Figure 4:
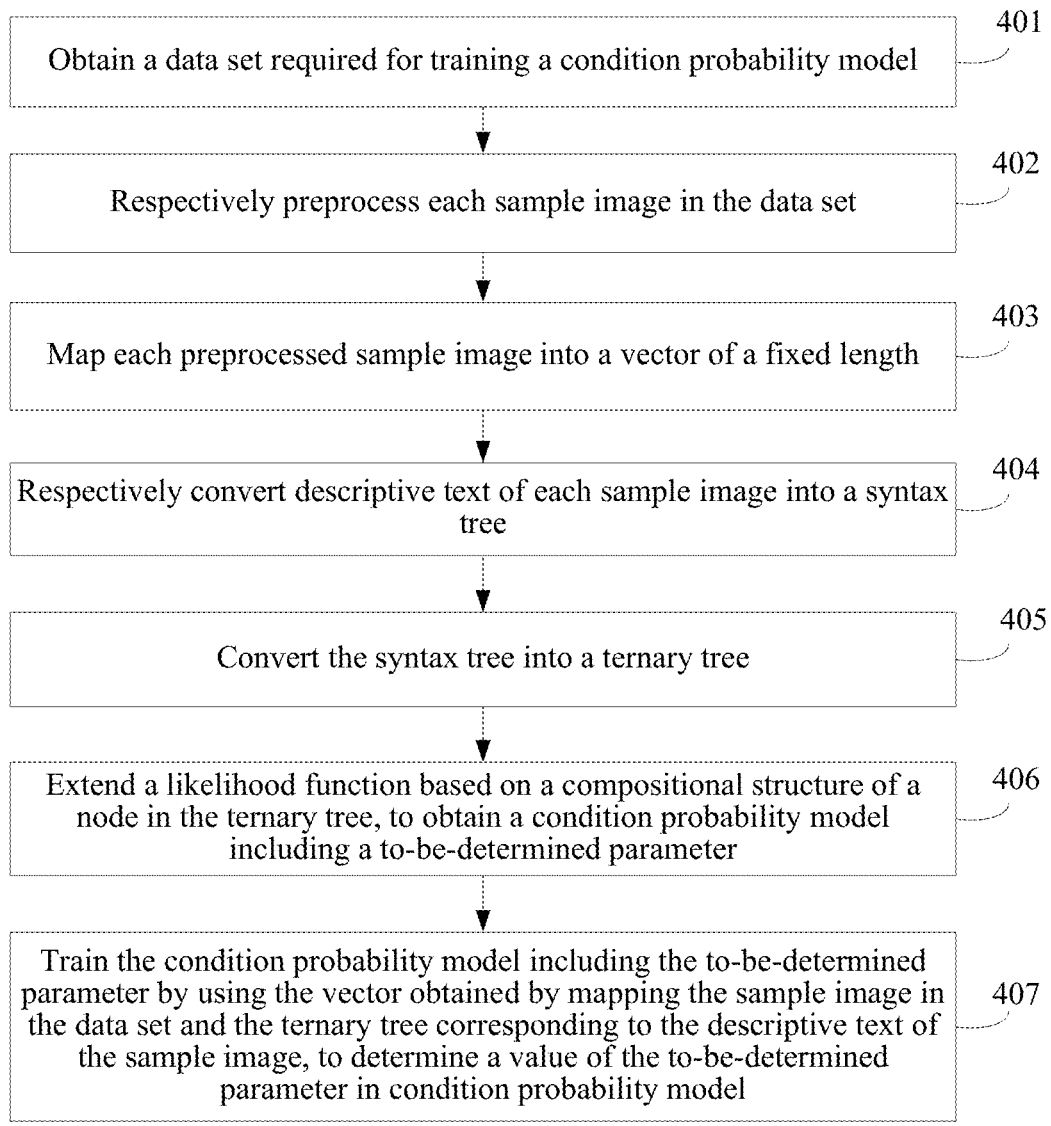
FIG. 4 is a schematic flowchart of a training condition probability model disclosed according to an embodiment of the present disclosure.

The following first describes a process of training a condition probability model. FIG. 4 is a schematic flowchart of training the condition probability model disclosed according to an embodiment of the present disclosure. Referring to FIG. 4, the training process may be applied to an application server and specifically includes:

S401. Obtaining a data set required for training a condition probability model.

The data set includes a plurality of data groups corresponding to a plurality of sample images. Each data group is a two-tuple used for describing a sample image, and the two-tuple is formed by feature information of the sample image and descriptive text corresponding to the sample image.

For example, a data set D may be represented as: $D=\{d^{(1)}, d^{(2)}, \ldots, d^{(N)}\}$, $d^{(i)}$ represents a two-tuple corresponding to a sample image, i ranges from 1 to N, and N is the number of data groups in a data set. $d^{(i)}=<p^{(i)}, t^{(i)}>$, where $p^{(i)}$ is feature information of a sample image and is formed by a three-dimensional matrix having a size of (height, width, 3). For parameters of the three-dimensional matrix, refer to the description of the embodiments described above. $t^{(i)}$ represents descriptive text corresponding to the sample image $p^{(i)}$.

S402. Respectively preprocessing each sample image in the data set.

That is, optionally, the sample images may be preprocessed. For the preprocessing process, refer to the related description of the embodiments described above.

S403. Mapping each preprocessed sample image into a vector of a fixed length.

For a process of mapping each preprocessed sample image into a vector, refer to the related description of the embodiment shown in FIG. 3. In the process of mapping the sample image into the vector, the above-described parameter k, number $n_1$ of convolution kernels, and preset length $n_2$ of the vector that are used for limiting the convolution kernel and the maximum size may be continuously adjusted, to finally determine values of the parameters.

S404. Respectively converting descriptive text of each sample image into a syntax tree.

The descriptive text is formed by a plurality of words, and may be displayed in a form of a syntax tree. Each node in the syntax tree is a word of the descriptive text. When the descriptive text is converted into the syntax tree, a preset relationship satisfied by words of a parent node and sub-nodes may be first based on. Moreover, the descriptive text is first converted into the syntax tree according to a first conversion rule that words in a left subtree in a node emerge at the left side of words in the descriptive text, and words in a right subtree in the node emerge at the right side of words in the descriptive text.

Figure 5A:
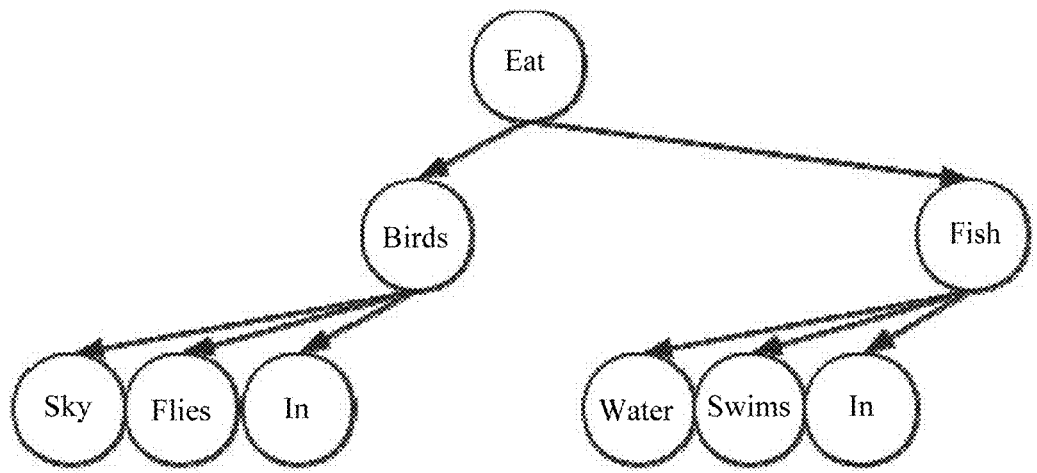
FIG. 5A is a schematic diagram of a syntax tree disclosed according to an embodiment of the present disclosure.

For example, assuming that the descriptive text corresponding to a sample image is "Birds flying in the sky eat fish swimming in the water", when the descriptive text is converted into a syntax tree, reference may be made to FIG. 5A. It may be learned from FIG. 5A that, "eat" in the syntax tree is a root node, and the root node has two sub-nodes which are respectively "birds" and "fish", and in addition, a node "birds" and a node "fish" respectively have three sub-nodes.

S405. Converting the syntax tree into a ternary tree.

In an embodiment, the syntax tree may be converted into the ternary tree according to the following rules.

The root node in the syntax tree is used as a root node in the ternary tree. For each node in the syntax tree, each node in each syntax tree is converted into a node in the ternary tree according to a preset second conversion rule. The second conversion rule is that: a leftmost sub-node in left children of the node is used as a root node of a left subtree of the node, a leftmost sub-node in right children of the node is used as a root node of a middle subtree in the node, and a leftmost sub-node in the sub-nodes on a same layer in the node is used as a root node of a right subtree of the node. It should be noted that for a node, children of the node are sub-nodes of the node, so that the left children are sub-nodes located at the left side of the node, that is, left sub-nodes; the right children are sub-node located at the right side of the node, that is, right sub-nodes; and the middle child is a sub-node located at a central position corresponding to the node in the ternary tree, that is, a middle sub-node.

Figure 5B:
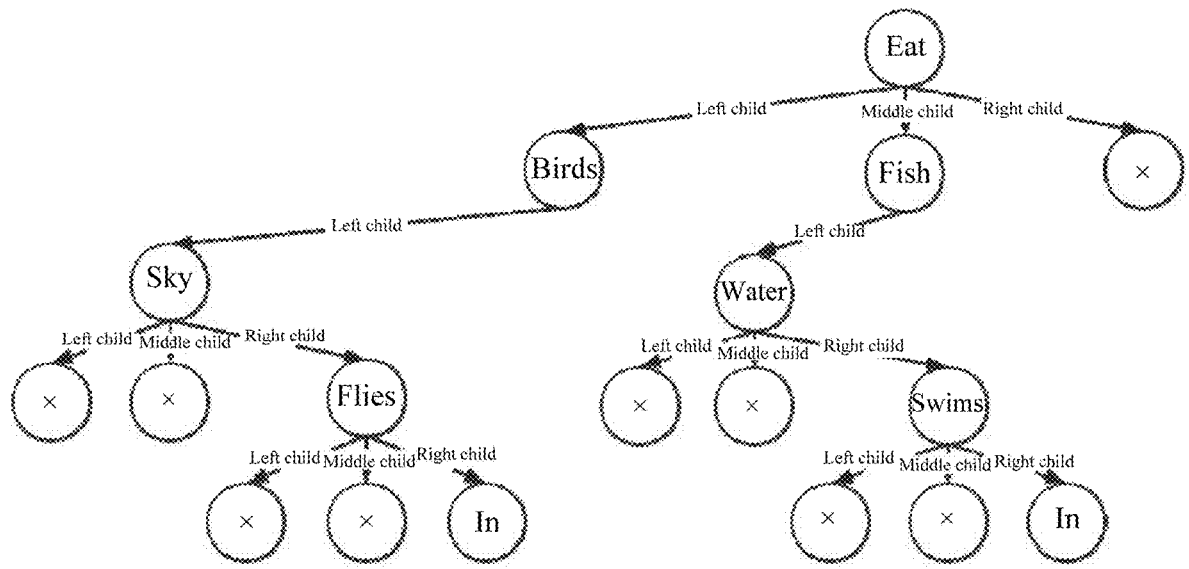
FIG. 5B is a schematic diagram of a ternary tree obtained after the syntax tree shown in FIG. 5A is converted.

For example, when the syntax tree shown in FIG. 5A is converted into a ternary tree, the root node "eat" in the syntax tree may be used as a root node of the ternary tree, and then for any node in the syntax tree, a left child, a middle child, and a right child of each node in the ternary tree are respectively determined according to the conversion rule. If a child in the node is empty, it indicates that the node is an empty node. FIG. 5B is a schematic diagram of a ternary tree obtained after the syntax tree shown in FIG. 5A is converted. A circle with a cross therein in FIG. 5B represents an empty node.

S406. Extending a likelihood function based on a compositional structure of nodes in the ternary tree, to obtain a condition probability model including a to-be-determined parameter.

The likelihood function essentially is a condition probability, and the condition probability is used for describing a probability that a descriptive sample is generated under a condition of a given image. For example, the condition probability may be represented as $P(t^{(i)}|p^{(i)})$.

Each node in the ternary tree has three sub-nodes. In this way, when the descriptive text generated based on the image is reflected when a condition probability is extended, and if a probability of each sub-node in the node in the ternary tree is generated when the image and the node are determined, $P(t^{(i)}|p^{(i)})$ may be extended into:

$$P(t^{(i)}|p^{(i)})=P(t_{root}^{(i)}|p^{(i)}) \cdot \Pi_{j=1}^{M} P(l(t_j^{(i)}),m(t_j^{(i)}),r(t_j^{(i)})|p^{(i)},A(t_j^{(i)})), \quad \text{(Formula 1)}$$

For the requirements of calculation, the following may further be obtained through extension:

$$P(t^{(i)}|p^{(i)})=P(t_{root}^{(i)}|p^{(i)}) \cdot \Pi_{j=1}^{M} P(l(t_j^{(i)}),m(t_j^{(i)}),r(t_j^{(i)})|p^{(i)},A(t_j^{(i)}))=P(t_{root}^{(i)}|p^{(i)}) \cdot \Pi_{j=2}^{M} P(l(t_j^{(i)})|p^{(i)},A(t_j^{(i)})).$$

$$P(m(t_j^{(i)})|p^{(i)},A(t_j^{(i)}),l(t_j^{(i)})).$$

$$P(r(t_j^{(i)})|p^{(i)},A(t_j^{(i)}),l(t_j^{(i)}),m(t_j^{(i)})), \quad \text{(Formula 2)}$$

$t_{root}^{(i)}$ represents a root node, $l(t_j^{(i)})$, $m(t_j^{(i)})$, $r(t_j^{(i)})$ respectively represent a left child, a middle child, and a right child of a $j^{th}$ node, $A(t_j^{(i)})$ represents the $j^{th}$ node and an ancestor node thereof, and M represents the total number of nodes in the ternary tree.

$P(l(t_j^{(i)})|p^{(i)},A(t_j^{(i)}))$ represents a probability that the left child of the node j is generated on the premises that a picture, the node j, and ancestor nodes of the node j are given.

$P(m(t_j^{(i)})|p^{(i)},A(t_j^{(i)}),l(t_j^{(i)}))$ represents a probability that the middle child of the node j is generated on the premises that a picture, the node j, the ancestor nodes of the node j, and the left child are given.

$P(r(t_j^{(i)})|p^{(i)},A(t_j^{(i)}),l(t_j^{(i)}),m(t_j^{(i)}))$ represents a probability that the right child of the node j is generated on the premises that a picture, the node j, ancestor nodes of the node j, and the left and middle children are given.

The ancestor nodes of the node include a parent node of the node and all nodes from the parent node of the node to the root node.

It should be noted that S406 may be performed before S404 and S405, or may be performed together with S404 and S405. This is not limited herein.

S407. Training the condition probability model including the to-be-determined parameter by using the vector obtained by mapping the sample image in the data set and the ternary tree corresponding to the descriptive text of the sample image, to determine a value of the to-be-determined parameter in condition probability model.

P in the Formula 1 and the Formula 2 is a function including an unknown parameter and represents nodes on a hidden layer in a recurrent neural network. To determine each parameter in P, training needs to be performed by using descriptive text of each sample image in a known data set.

Figure 6:
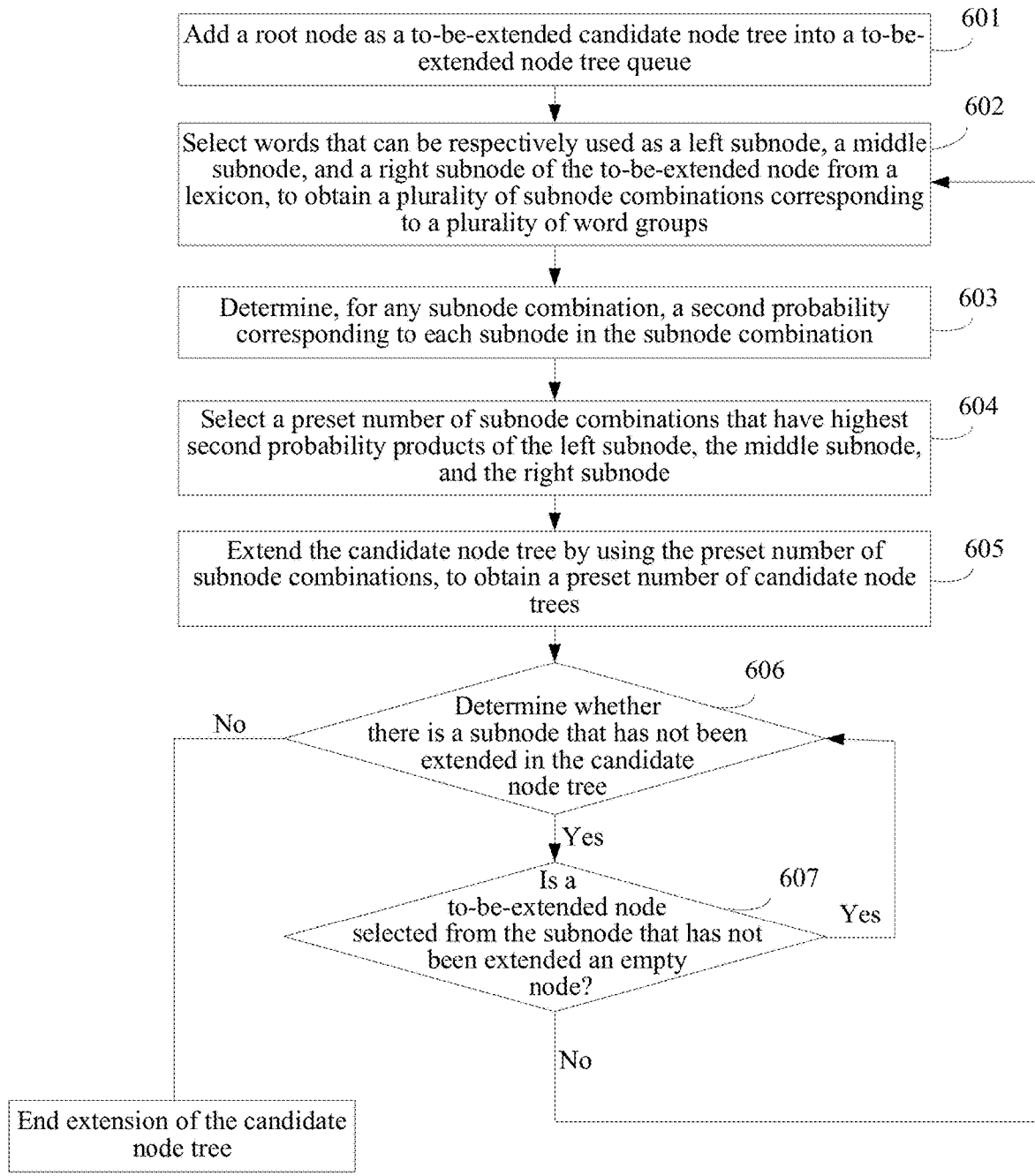
FIG. 6 is a schematic diagram of an implementation process of an extended candidate node tree in a chat message processing method disclosed according to an embodiment of the present disclosure.

On the premises that the condition probability model is obtained through training in FIG. 4, and after the application server determines the root node, for any root node, reference may be made to FIG. 6 for a process in which words are selected from the lexicon to extend the candidate node tree in which the root node is located. FIG. 6 shows an implementation of extending the candidate node tree based on the root node when the application server determines the root node. That is, the procedure in FIG. 6 is equivalent to a specific implementation of S307. In FIG. 6, a description is provided by using an example in which the candidate node tree is a ternary tree, and the procedure may specifically include:

S601. After a root node of a ternary tree used for describing a vector $p^{(i)}$ is determined, adding a root node as a to-be-extended candidate node tree into a to-be-extended node tree queue, and determining the root node as a to-be-extended node in the to-be-extended candidate node tree.

Before S601, a to-be-extended node tree queue may be first initialized, so that the to-be-extended node tree queue is an empty list. In this case, after the root node is added to the to-be-extended queue as a candidate tree node having only one node, the candidate node tree is a first to-be-extended candidate node tree. Then, S602 and a subsequent operation are performed, and the candidate tree node tree is extended by extending sub-nodes on each layer of the root node.

S602. Selecting, according to a syntax relationship, words that can be respectively used as a left sub-node, a middle sub-node, and a right sub-node of the to-be-extended node from a lexicon, to obtain a plurality of sub-node combinations corresponding to a plurality of word groups.

Each word group includes three words, and each sub-node combination corresponds to the left sub-node, the middle sub-node, and the right sub-node.

S603. Generating, for any sub-node combination, second probabilities corresponding to the left sub-node, the middle sub-node, and the right sub-node of the to-be-extended node based on a preset ordinary node probability model and on the premises that the image, the to-be-extended node, and ancestor nodes of the to-be-extended node are respectively determined.

Specifically, the second probability of generating the left sub-node may be calculated according to $P(l(t_j^{(i)})|p^{(i)},A(t_j^{(i)}))$ on the premises that the vector $p^{(i)}$, a to-be-extended node j, and ancestor nodes of the to-be-extended node j are determined. Then, the second probability of generating the middle sub-node is calculated according to $P(m(t_j^{(i)})|p^{(i)},A(t_j^{(i)}),l(t_j^{(i)}))$ on the premises that the vector $p^{(i)}$, the to-be-extended node j, the ancestor nodes of the node j, and the left sub-node are determined. The second probability of generating the right sub-node of to-be-extended node j is calculated according to $P(r(t_j^{(i)})|p^{(i)},A(t_j^{(i)}),l(t_j^{(i)}),m(t_j^{(i)}))$ on the premises that the vector $p^{(i)}$, the to-be-extended node j, the ancestor nodes of the to-be-extended node j, the left sub-node, and the middle sub-node are given.

S604. Selecting a preset number of sub-node combinations that have highest second probability products of the left sub-node, the middle sub-node, and the right sub-node.

S605. Extending the candidate node tree by using the preset number of sub-node combinations, to obtain a preset number of candidate node trees S606. For any extended candidate node tree, determining whether there is a sub-node that has not been extended in the candidate node tree; performing S607 if there is a sub-node that has not been extended in the candidate node tree; and ending extension of the candidate node tree if there is no sub-node that has not been extended in the candidate node tree.

S607. Selecting, from the sub-node that has not been extended, a sub-node as the to-be-extended node, and going back to S606 if the to-be-extended node is an empty node; or going back to S602 if the to-be-extended candidate node is not an empty node.

The following describes a chat message processing apparatus provided in an embodiment of the present disclosure. The chat message processing apparatus described below may be referred corresponding to the chat message processing method described above.

Figure 7:
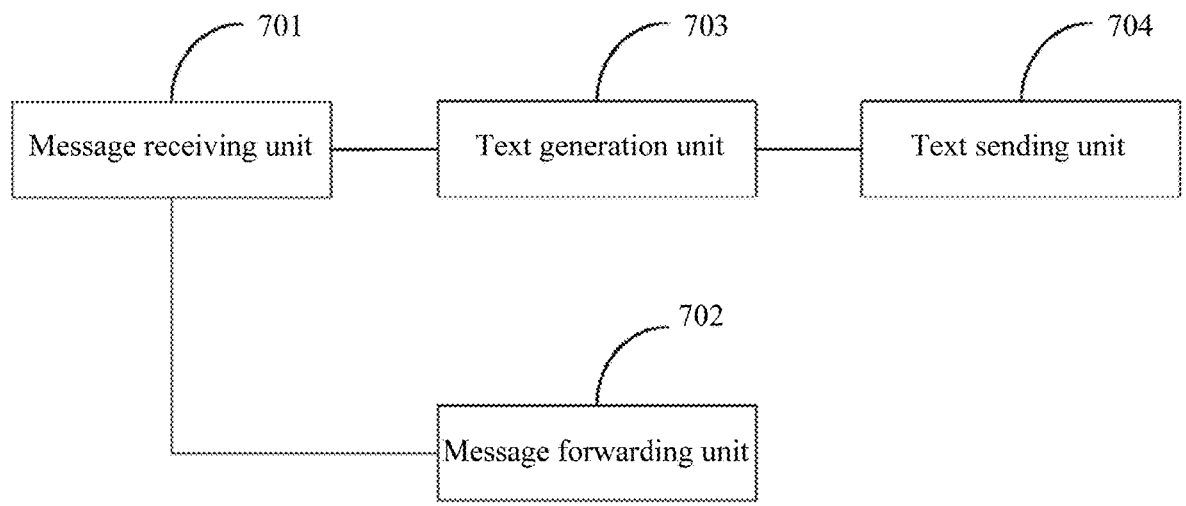
FIG. 7 is a schematic diagram of a chat message processing apparatus disclosed according to an embodiment of the present disclosure.

FIG. 7 is a schematic diagram of a compositional structure of a chat message processing apparatus according to the present disclosure. Referring to FIG. 7, the apparatus in one embodiment may include: a message receiving unit 701, a message forwarding unit 702, a text generation unit 703, and a text sending unit 704.

The message receiving unit 701 may be configured to receive a chat message sent by a terminal of a sender, the chat message carrying information about a receiver. The message forwarding unit 702 may be configured to forward the chat message to a terminal of the receiver. The text generation unit 703 may be configured to generate, when it is determined that the chat message includes an image, at least one group of descriptive texts used for describing the image. The text sending unit 704 may be configured to: send the at least one group of descriptive texts of the image to the terminal of the receiver, and when the terminal of the receiver displays the image, display the at least one group of descriptive texts as at least one candidate entering-item associated with the image.

In an embodiment, the text generation unit 703 includes: a node tree construction subunit and a node tree conversion subunit.

The node tree construction subunit may be configured to select words from a lexicon based on a preset mapping relationship between an image feature and a word, to construct at least one node tree used for describing the image when it is determined that the chat message includes the image, and the node tree conversion subunit may be configured to respectively convert each node tree into a group of descriptive texts, to obtain at least one group of descriptive texts.

In an embodiment, the node tree construction subunit includes: a first probability determining subunit, a root node selection subunit, a second probability determining subunit, a score determining subunit, a target node tree determining subunit, and a node tree generation subunit.

The first probability determining subunit may be configured to determine, based on a preset root node probability model, a first probability that each word in the lexicon is used as a root node in the node tree used for describing the image. The root node selection subunit may be configured to select a specified number of words having highest first probabilities as a specified number of root nodes respectively.

The second probability determining subunit may be configured to: select a word as a sub-node in a candidate node tree for any root node from the lexicon, and determine, based on a preset ordinary node probability model, a second probability that the selected word is used as the sub-node in the candidate node tree, where the candidate node tree is a node tree that is obtained through extension by using the root node as a reference and that is used for describing the image.

The score determining subunit may be configured to determine, for each candidate node tree, a score of the candidate node tree according to the first probability corresponding to the root node in the candidate node tree and the second probability corresponding to the word forming the sub-node in the candidate node tree.

The target node tree determining subunit may be configured to determine at least one candidate node tree having a highest score as a target node tree used for describing the image. The node tree generation subunit may be configured to use each target node tree as the node tree used for describing the image.

In an embodiment, the second probability determining subunit includes: a first pre-extension subunit, a tree extension subunit, and a second pre-extension subunit.

The first pre-extension subunit may be configured to determine, for any root node, the root node as a to-be-extended node in the candidate node tree. The tree extension subunit may be configured to: select for any to-be-extended node, a word that can be used as a sub-node of the to-be-extended node from the lexicon, and determine, based on the preset ordinary node probability model, a second probability that the selected word is used as the sub-node of the to-be-extended node.

The second pre-extension subunit may be configured to: use the sub-node obtained through extension as the to-be-extended node, and perform the operation of selecting a word as a sub-node of the to-be-extended node from the lexicon and determining a second probability that the selected word is used as the sub-node of the to-be-extended node, until the candidate node tree fails to be extended.

In an embodiment, the node tree used for describing the image is a ternary tree; and the tree extension subunit is specifically configured to select words as a left sub-node, a right sub-node, and a middle sub-node of the to-be-extended node respectively from the lexicon, and respectively determine, based on the preset ordinary node probability model, second probabilities that the left sub-node, the right sub-node, and the middle sub-node of the to-be-extended node are generated on the premises that the image, the to-be-extended node, and ancestor nodes of the to-be-extended node are determined.

In an embodiment, the first probability determining subunit includes: an image preprocessing subunit, a vector input subunit, and a probability determining subunit.

The image preprocessing subunit may be configured to convert the image into a vector of a preset length. The vector input subunit may be configured to input the vector into the root node probability model. The probability determining subunit may be configured to determine the first probability that each word in the lexicon is used as the root node in the node tree used for describing the image.

In an embodiment, the chat message processing apparatus further includes a text forwarding unit. The text forwarding unit may be configured to forward, after the text sending unit sends the descriptive text, the chat message including the descriptive text to the terminal of the sender when receiving the chat message that is sent by the terminal of the receiver to the terminal of the sender and that includes the descriptive text.

One embodiment of the present disclosure provides a chat information processing apparatus, including the message receiving unit, the text generation unit, the message forwarding unit, and the text sending unit. When a chat message that is received by the message receiving unit and that is sent by the terminal of the sender includes an image, the text generation unit generates at least one group of descriptive texts used for describing the image, and the text sending unit sends the at least one group of descriptive texts of the image to the terminal of the receiver, so that when the terminal of the receiver displays the image, the terminal of the receiver displays the at least one group of descriptive texts as at least one candidate entering-item associated with the image. Because the descriptive text used for describing the image may reflect information included in the image, the user can rapidly learn of key information included in the image according to the descriptive text; and moreover, the user may directly select the descriptive text of the image as a reply to the chat message, thereby facilitating improvement of smoothness of instant messaging interaction.

An embodiment of the present disclosure further provides a server, the server being capable of performing the chat message processing method in the foregoing embodiments.

Figure 8:
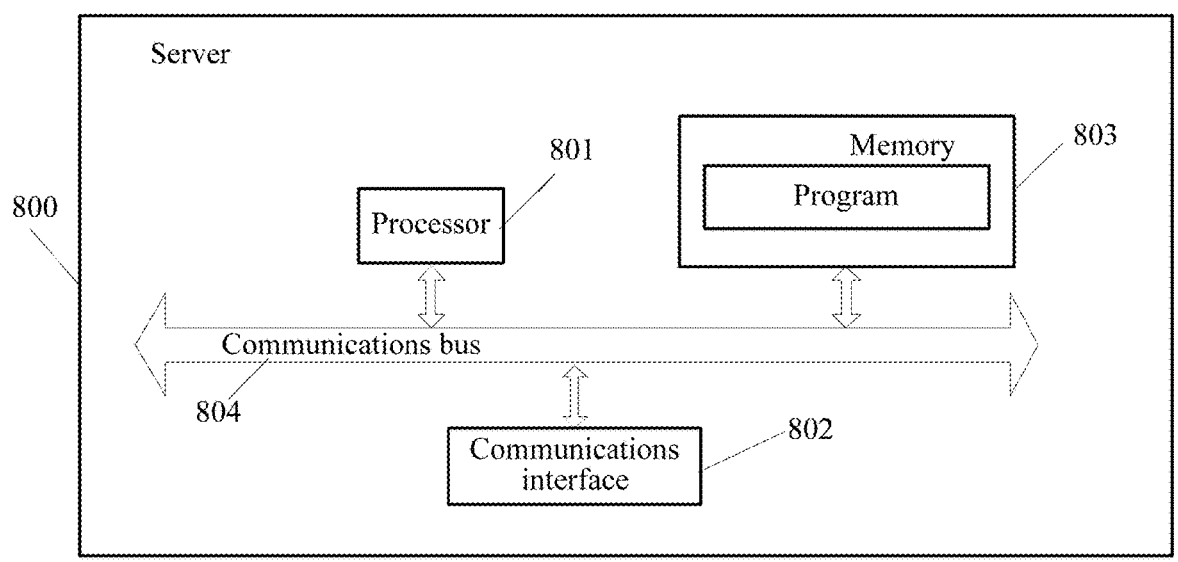
FIG. 8 is a schematic diagram of an application server disclosed according to an embodiment of the present disclosure.

FIG. 8 shows a structural block diagram of hardware of the server. Referring to FIG. 8, the terminal 800 may include: a processor 801, a communications interface 802, a memory 803, and a communications bus 804.

The processor 801, the communication interface 802, and the memory 803 implement communication between each other by using the communications bus 804.

In an embodiment, the communications interface 802 may be an interface of a communications module, for example, an interface of a GSM module. The processor 801 is configured to execute a program; the memory 803 is configured to store a program; and the program may include program code, and the program code includes a computer operating instruction.

The processor 801 may be a Central Processing Unit (CPU) or an Application Specific Integrated Circuit (ASIC) or may be configured as one or more integrated circuits for implementing the embodiments of the present application.

The memory 803 may include a high-speed RAM memory, may also include a non-volatile memory, for example, at least one magnetic disk memory, a flash component, or other volatile solid-state storage components.

The program may be specifically used for: receiving a chat message sent by a terminal of a sender, the chat message carrying information about a receiver; generating, when it is determined that the chat message includes an image, at least one group of descriptive texts used for describing the image; forwarding the chat message to a terminal of the receiver; and sending the at least one group of descriptive texts of the image to the terminal of the receiver, and when the terminal of the receiver displays the image, displaying the at least one group of descriptive texts as at least one candidate entering-item associated with the image.

In an embodiment, the generating at least one group of descriptive texts used for describing the image includes: selecting words from a lexicon based on a preset mapping relationship between an image feature and a word, to construct at least one node tree used for describing the image; and respectively converting each node tree into a group of descriptive texts, to obtain at least one group of descriptive texts.

In an embodiment, the selecting words from a lexicon based on a preset mapping relationship between an image feature and a word, to construct at least one node tree used for describing the image includes: determining, based on a preset root node probability model, a first probability that each word in the lexicon is used as a root node in the node tree used for describing the image; selecting a specified number of words having highest first probabilities as a specified number of root nodes respectively; selecting a word as a sub-node in a candidate node tree for any root node from the lexicon, and determining, based on a preset ordinary node probability model, a second probability that the selected word is used as the sub-node in the candidate node tree, where the candidate node tree is a node tree that is obtained through extension by using the root node as a reference and that is used for describing the image; determining, for each candidate node tree, a score of the candidate node tree according to the first probability corresponding to the root node in the candidate node tree and the second probability corresponding to the word forming the sub-node in the candidate node tree; determining at least one candidate node tree having a highest score as a target node tree used for describing the image; and using each target node tree as the node tree used for describing the image.

In an embodiment, the selecting a word as a sub-node in a candidate node tree for any root node from the lexicon, and determining, based on a preset ordinary node probability model, a second probability that the selected word is used as the sub-node in the candidate node tree includes: determining, for any root node, the root node as a to-be-extended node in the candidate node tree; selecting a word as a sub-node of the to-be-extended node from the lexicon, and determining, based on the preset ordinary node probability model, a second probability that the selected word is used as the sub-node of the to-be-extended node; and using the sub-node obtained through extension as the to-be-extended node, and perform the operation of selecting a word as a sub-node of the to-be-extended node from the lexicon and determining a second probability that the selected word is used as the sub-node of the to-be-extended node, until the candidate node tree fails to be extended.

In an embodiment, the node tree used for describing the image is a ternary tree; and the selecting a word as a sub-node of the to-be-extended node from the lexicon, and determining, based on the preset ordinary node probability model, a second probability that the selected word is used as the sub-node of the to-be-extended node includes: selecting words as a left sub-node, a right sub-node, and a middle sub-node of the to-be-extended node respectively from the lexicon, and respectively determining, based on the preset ordinary node probability model, second probabilities that the left sub-node, the right sub-node, and the middle sub-node of the to-be-extended node are generated on the premises that the image, the to-be-extended node, and ancestor nodes of the to-be-extended node are determined.

In an embodiment, the determining, based on a preset root node probability model, a first probability that each word in the lexicon is used as a root node in the node tree used for describing the image includes: converting the image into a vector of a preset length; inputting the vector into the root node probability model; and determining the first probability that each word in the lexicon is used as the root node in the node tree used for describing the image.

In an embodiment, after the sending the at least one group of descriptive texts of the image to the terminal of the receiver, the method further includes: forwarding the chat message including the descriptive text to the terminal of the sender when receiving the chat message that is sent by the terminal of the receiver to the terminal of the sender and that includes the descriptive text.

In addition, an embodiment of the present disclosure further provides a storage medium, the storage medium being configured to store program code, and the program code being configured to perform the chat message processing method according to the foregoing embodiments.

An embodiment of the present disclosure further provides a computer program product including an instruction, when run on a server, the computer program product enabling the server to perform the chat message processing method according to the foregoing embodiments.

By using the foregoing technical solutions, after the server in instant messaging receives a chat message sent by the terminal of the sender, if it is determined that the chat message includes an image, at least one group of descriptive text used for describing the image is generated, and the at least one group of descriptive text generated for the image is sent to the terminal. In this way, the terminal not only can display the image of the chat message, but also can display the at least one group of descriptive text as an optional entering item associated with the image. Because the descriptive text used for describing the image may reflect information included in the image, the user can rapidly learn of key information included in the image according to the descriptive text; and moreover, the user may further directly select the descriptive text of the image as a reply to the chat message, thereby facilitating improvement of smoothness of instant messaging interaction.

It should be noted that the embodiments in this specification are described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the corresponding part.

Functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product. The computer software product may be stored in a storage medium, and includes several instructions for instructing a computer device (which may be a personal computer, a server, a network device, or the like) to perform all or a part of the steps of the method embodiments of the present disclosure. The foregoing storage medium includes: any medium that can store program code, such as a USB flash memory drive, a removable hard disk, a read-only memory (ROM), a random-access memory (RAM), a magnetic disk, or an optical disc.

Finally, it should be noted that the relational terms herein such as first and second are used only to differentiate an entity or operation from another entity or operation, and do not require or imply any actual relationship or sequence between these entities or operations. Moreover, the terms "include", "include", and any variants thereof are intended to cover a non-exclusive inclusion. Therefore, a process, method, object, or device that includes a series of elements not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

The above description of the disclosed embodiments enables a person skilled in the art to implement or use the present disclosure. Various modifications of the embodiments are apparent to a person of ordinary skill in the art, and general principles defined in the specification may be implemented in other embodiments without departing from the spirit or scope of the present disclosure. Therefore, the present disclosure is not limited to these embodiments illustrated in the present disclosure, but needs to conform to the broadest scope consistent with the principles and novel features disclosed in the present disclosure.

The above descriptions are merely embodiments of the present disclosure, and it should be noted that, a person of ordinary skill in the art may make various improvements and refinements without departing from the spirit of the present disclosure. All such modifications and refinements should also be intended to be covered by the present disclosure.

What is claimed is:

1. A chat message processing method for a server, comprising:
   receiving a chat message sent by a sending terminal, the chat message including a chat image and carrying information about a receiving terminal;
   generating at least one group of descriptive texts describing the chat image via a condition probability model, wherein the condition probability model is trained via:
      obtaining sample images with correlating sample descriptive texts;
      converting each of the sample descriptive texts to a syntax tree via a first conversion rule that words in a left subtree in a node of the syntax tree emerge at a left side of words in the each of the sample descriptive texts, and words in a right subtree in the node of the syntax tree emerge at a right side of words in the each of the sample descriptive texts; and
      converting the syntax tree to a ternary tree via a second conversion rule that a leftmost sub-node in left children of the node is used as a root node of a left subtree of the node, a leftmost sub-node in right children of the node is used as a root node of a middle subtree in the node, and a root node of a right subtree of the node is optionally an empty node; and
   sending the chat message and the at least one group of descriptive texts of the image to the receiving terminal to be together displayed on the receiving terminal.

2. The chat message processing method according to claim 1, wherein the generating the at least one group of descriptive texts comprises selecting words from a lexicon based on a preset mapping relationship between image features and words, and wherein the selecting the words from the lexicon comprises:
   determining, based the condition probability model, a first probability that each word in the lexicon is used as a root node in the node tree;
   selecting a number of words having highest first probabilities as a number of root nodes respectively;
   selecting a word as a sub-node in a candidate node tree for any root node from the lexicon, and determining, based on the condition probability model, a second probability that the selected word is used as the sub-node in the candidate node tree;
   determining, for each candidate node tree, a score of the candidate node tree according to the first probability corresponding to the root node in the candidate node tree and the second probability corresponding to the word forming the sub-node in the candidate node tree;
   determining at least one candidate node tree having a highest score as a target node tree; and
   using each target node tree as the node tree.

3. The chat message processing method according to claim 2, wherein the selecting the word as the sub-node in the candidate node tree for any root node from the lexicon, and determining, based on condition probability model, the second probability that the selected word is used as the sub-node in the candidate node tree comprises:
   determining, for any root node, the root node as a to-be-extended node in the candidate node tree;
   selecting a word as a sub-node of the to-be-extended node from the lexicon, and determining, based on the condition probability model, a second probability that the selected word is used as the sub-node of the to-be-extended node; and
   using the sub-node obtained through extension as the to-be-extended node, and performing the operation of selecting a word as a sub-node of the to-be-extended node from the lexicon and determining a second probability that the selected word is used as the sub-node of the to-be-extended node, until the candidate node tree fails to be extended.

4. The chat message processing method according to claim 3, wherein the selecting the word as the sub-node of the to-be-extended node from the lexicon, and determining, based on the condition probability model, the second probability that the selected word is used as the sub-node of the to-be-extended node comprises:
   selecting words as a left sub-node, a right sub-node, and a middle sub-node of the to-be-extended node respectively from the lexicon, and respectively determining, based on the condition probability model, second probabilities that the left sub-node, the right sub-node, and the middle sub-node of the to-be-extended node are generated upon a determination of the image, the to-be-extended node, and ancestor nodes of the to-be-extended node.

5. The chat message processing method according to claim 2, wherein the determining, based on the condition probability model, the first probability that each word in the lexicon is used as the root node in the node tree comprises:
   converting the image into a vector of a preset length;
   inputting the vector into the condition probability model; and
   determining the first probability that each word in the lexicon is used as the root node in the node tree.

6. The chat message processing method according to claim 1, wherein, after the sending the at least one group of descriptive texts of the image to the receiving terminal, the method further comprises:
   upon receiving a chat message sent by the receiving terminal to the sending terminal, wherein the chat message sent by the receiving terminal contains a descriptive text from the at least one group of descriptive texts, forwarding the chat message sent by the receiving terminal including the descriptive text from the at least one group of descriptive texts to the sending terminal.

7. The chat message processing method according to claim 1, wherein the left side of the words includes a left noun, a left verb, and a left adverb, and wherein the left noun is positioned at a grand-children layer, the left verb is positioned at a great-grand-children layer, and the left adverb is positioned at a great-great-grand-children layer.

8. A chat message processing apparatus, comprising: a memory storing computer program instructions; and a processor coupled to the memory and, upon executing the computer program instructions, configured to perform:
   receiving a chat message sent by a sending terminal, the chat message including a chat image and carrying information about a receiving terminal;
   generating at least one group of descriptive texts describing the chat image via a condition probability model, wherein the condition probability model is trained via:
      obtaining sample images with correlating sample descriptive texts;
      converting each of the sample descriptive texts to a syntax tree via a first conversion rule that words in a left subtree in a node of the syntax tree emerge at a left side of words in the each of the sample descriptive texts, and words in a right subtree in the node of the syntax tree emerge at a right side of words in the each of the sample descriptive texts; and
      converting the syntax tree to a ternary tree via a second conversion rule that a leftmost sub-node in left children of the node is used as a root node of a left subtree of the node, a leftmost sub-node in right children of the node is used as a root node of a middle subtree in the node, and a root node of a right subtree of the node is optionally an empty node; and
   sending the chat message and the at least one group of descriptive texts of the image to the receiving terminal to be together displayed on the receiving terminal.

9. The chat message processing apparatus according to claim 8, wherein the generating the at least one group of descriptive texts comprises selecting words from a lexicon based on a preset mapping relationship between image features and words, and wherein the selecting words from the lexicon comprises:
   determining, based on the condition probability model, a first probability that each word in the lexicon is used as a root node in the node tree;
   selecting a number of words having highest first probabilities as a number of root nodes respectively;
   selecting a word as a sub-node in a candidate node tree for any root node from the lexicon, and determining, based on the condition probability model, a second probability that the selected word is used as the sub-node in the candidate node tree;
   determining, for each candidate node tree, a score of the candidate node tree according to the first probability corresponding to the root node in the candidate node tree and the second probability corresponding to the word forming the sub-node in the candidate node tree;
   determining at least one candidate node tree having a highest score as a target node tree; and
   using each target node tree as the node tree.

10. The chat message processing apparatus according to claim 9, wherein the selecting the word as the sub-node in the candidate node tree for any root node from the lexicon, and determining, based on the condition probability model, the second probability that the selected word is used as the sub-node in the candidate node tree comprises:
   determining, for any root node, the root node as a to-be-extended node in the candidate node tree;
   selecting a word as a sub-node of the to-be-extended node from the lexicon, and determining, based on the condition probability model, a second probability that the selected word is used as the sub-node of the to-be-extended node; and
   using the sub-node obtained through extension as the to-be-extended node, and performing the operation of selecting a word as a sub-node of the to-be-extended node from the lexicon and determining a second probability that the selected word is used as the sub-node of the to-be-extended node, until the candidate node tree fails to be extended.

11. The chat message processing apparatus according to claim 10, wherein the selecting the word as the sub-node of the to-be-extended node from the lexicon, and determining, based on the condition probability model, the second probability that the selected word is used as the sub-node of the to-be-extended node comprises:
   selecting words as a left sub-node, a right sub-node, and a middle sub-node of the to-be-extended node respectively from the lexicon, and respectively determining, based on the condition probability model, second probabilities that the left sub-node, the right sub-node, and the middle sub-node of the to-be-extended node are generated upon a determination of the image, the to-be-extended node, and ancestor nodes of the to-be-extended node.

12. The chat message processing apparatus according to claim 9, wherein the determining, based on the condition probability model, the first probability that each word in the lexicon is used as the root node in the node tree comprises:
   converting the image into a vector of a preset length;
   inputting the vector into the condition probability model; and
   determining the first probability that each word in the lexicon is used as the root node in the node tree.

13. The chat message processing apparatus according to claim 8, wherein, after the sending the at least one group of descriptive texts to the receiving terminal, the processor is further configured to perform:
   upon receiving a chat message sent by the receiving terminal to the sending terminal, wherein the chat message sent by the receiving terminal contains a descriptive text from the at least one group of descriptive texts, forwarding the chat message sent by the receiving terminal including the descriptive text from the at least one group of descriptive texts to the sending terminal.

14. The chat message processing apparatus according to claim 8, wherein the left side of the words includes a left noun, a left verb, and a left adverb, and wherein the left noun is positioned at a grand-children layer, the left verb is positioned at a great-grand-children layer, and the left adverb is positioned at a great-great-grand-children layer.

15. A non-transitory computer-readable storage medium storing computer program instructions executable by at least one processor to perform:
receiving a chat message sent by a sending terminal, the chat message including a chat image and carrying information about a receiving terminal;
generating at least one group of descriptive texts describing the chat image via a condition probability model, wherein the condition probability model is trained via:
obtaining sample images with correlating sample descriptive texts;
converting each of the sample descriptive texts to a syntax tree via a first conversion rule that words in a left subtree in a node of the syntax tree emerge at a left side of words in the each of the sample descriptive texts, and words in a right subtree in the node of the syntax tree emerge at a right side of words in the each of the sample descriptive texts; and
converting the syntax tree to a ternary tree via a second conversion rule that a leftmost sub-node in left children of the node is used as a root node of a left subtree of the node, a leftmost sub-node in right children of the node is used as a root node of a middle subtree in the node, and a root node of a right subtree of the node is optionally an empty node; and
sending the chat message and the at least one group of descriptive texts of the image to the receiving terminal to be together displayed on the receiving terminal.

16. The non-transitory computer-readable storage medium according to claim 15, wherein the generating the at least one group of descriptive texts comprises selecting words from a lexicon based on a preset mapping relationship between image features and words, and wherein the selecting words from the lexicon comprises:
determining, based on the condition probability model, a first probability that each word in the lexicon is used as a root node in the node tree;
selecting a number of words having highest first probabilities as a number of root nodes respectively;
selecting a word as a sub-node in a candidate node tree for any root node from the lexicon, and determining, based on the condition probability model, a second probability that the selected word is used as the sub-node in the candidate node tree;
determining, for each candidate node tree, a score of the candidate node tree according to the first probability corresponding to the root node in the candidate node tree and the second probability corresponding to the word forming the sub-node in the candidate node tree;
determining at least one candidate node tree having a highest score as a target node tree; and
using each target node tree as the node tree.

17. The non-transitory computer-readable storage medium according to claim 16, wherein the selecting the word as the sub-node in the candidate node tree for any root node from the lexicon, and determining, based on the condition probability model, the second probability that the selected word is used as the sub-node in the candidate node tree comprises:
determining, for any root node, the root node as a to-be-extended node in the candidate node tree;
selecting a word as a sub-node of the to-be-extended node from the lexicon, and determining, based on the condition probability model, the second probability that the selected word is used as the sub-node of the to-be-extended node; and
using the sub-node obtained through extension as the to-be-extended node, and performing the operation of selecting a word as a sub-node of the to-be-extended node from the lexicon and determining a second probability that the selected word is used as the sub-node of the to-be-extended node, until the candidate node tree fails to be extended.

18. The non-transitory computer-readable storage medium according to claim 17, wherein the selecting the word as the sub-node of the to-be-extended node from the lexicon, and determining, based on the condition probability model, the second probability that the selected word is used as the sub-node of the to-be-extended node comprises:
selecting words as a left sub-node, a right sub-node, and a middle sub-node of the to-be-extended node respectively from the lexicon, and respectively determining, based on the condition probability model, second probabilities that the left sub-node, the right sub-node, and the middle sub-node of the to-be-extended node are generated upon a determination of the image, the to-be-extended node, and ancestor nodes of the to-be-extended node.

19. The non-transitory computer-readable storage medium according to claim 16, wherein the determining, based on a preset root node probability model, a first probability that each word in the lexicon is used as a root node in the node tree used for describing the image comprises:
converting the image into a vector of a preset length;
inputting the vector into the root node condition probability model; and
determining the first probability that each word in the lexicon is used as the root node in the node tree.

20. The non-transitory computer-readable storage medium according to claim 15, wherein the left side of the words includes a left noun, a left verb, and a left adverb, and wherein the left noun is positioned at a grand-children layer, the left verb is positioned at a great-grand-children layer, and the left adverb is positioned at a great-great-grand-children layer.

* * * * *